United States Patent
Gillet et al.

(10) Patent No.: US 6,345,444 B1
(45) Date of Patent: Feb. 12, 2002

(54) HAND HELD APPARATUS FOR TRANSVERSE CUTTING OF A NOT EASILY ACCESSIBLE PIPE

(75) Inventors: Pascal Gillet, Sarcey; Fabrice Petit, Orcevaux, both of (FR)

(73) Assignee: Gillet Outlillage, Nogent (FR)

(*) Notice: Subject to any disclaimer, the term of this patent is extended or adjusted under 35 U.S.C. 154(b) by 0 days.

(21) Appl. No.: 09/508,468
(22) PCT Filed: Sep. 11, 1998
(86) PCT No.: PCT/FR98/01946
  § 371 Date: Mar. 10, 2000
  § 102(e) Date: Mar. 10, 2000
(87) PCT Pub. No.: WO99/14007
  PCT Pub. Date: Mar. 25, 1999

(30) Foreign Application Priority Data

Sep. 12, 1997 (FR) .............................. 97 11381

(51) Int. Cl.[7] .............................................. B23D 21/08
(52) U.S. Cl. .................... 30/99; 30/98; 30/101; 76/101.1; 76/115; 76/119
(58) Field of Search ................ 30/95, 96, 99, 30/101, 102, 98; 76/101.1, 115, 119

(56) References Cited

U.S. PATENT DOCUMENTS

| | | | | |
|---|---|---|---|---|
| 1,715,921 A | * | 6/1929 | Himes | 30/98 |
| 1,737,889 A | * | 12/1929 | McKnight et al. | 30/99 |
| 2,697,875 A | * | 12/1954 | McIver | 30/99 |
| 2,937,440 A | * | 5/1960 | Kelly | 30/101 |
| 2,956,339 A | | 10/1960 | Jonasson | 30/101 |
| 3,163,932 A | | 1/1965 | Adams | 30/101 |
| 4,078,304 A | * | 3/1978 | Netzel | 30/101 |

FOREIGN PATENT DOCUMENTS

FR  2423296  11/1979

* cited by examiner

Primary Examiner—Hwei-Siu Payer
(74) Attorney, Agent, or Firm—Young & Thompson

(57) ABSTRACT

A hand-held apparatus for cutting transversely a pipe using a slitter co-operating with rollers to produce a deepening cut, is formed of two half-shells mounted opposite around the pipe with adjustable clamping elements one at least supporting a slitter or radially mobile, in the cutting plane, and the other, at least two rollers rotating in the cutting plane and arranged in pair facing each slitter on the other half-shell to compensate the cutting force in the assembly rotation about the pipe resulting from the cooperation between a tangential driving tool and catching elements distributed over the outer surface or on the periphery of each half-shell.

10 Claims, 2 Drawing Sheets

HAND HELD APPARATUS FOR TRANSVERSE CUTTING OF A NOT EASILY ACCESSIBLE PIPE

CROSS REFERENCE TO RELATED APPLICATION

This is the 35 USC 371 national stage of international application PCT/FR98/01946 filed on Sep. 11, 1998, which designated the United States of America.

FIELD OF THE INVENTION

The invention relates to a hand-held apparatus for cutting transversely a hollow cylindrical object such as a pipe, particularly suitable for situations in which the said pipe is not easily accessible and in which it is difficult to insert conventional cutting tools; in particular, the invention can be used in the automotive field, for example for cutting a pipe forming all or part of a car exhaust system.

BACKGROUND OF INVENTION

The professionals concerned are well aware of the difficulties of disassembling a car exhaust pipe during a repair or a replacement; it is very frequently impossible to disassemble or replace it, consequently it is often necessary for example to make a clean cut on an intermediate pipe if the intermediate pipe is still sound and to connect it with a spare part provided for it.

It is always difficult to cut a hollow cylindrical object in that it is difficult to make genuinely transverse cuts, in other words perpendicular to the center line of the pipe, and furthermore a clean well-defined cut cannot be made unless the saw is held correctly; obviously, this needs special know how and in particular sufficient space is necessary around the part to perform this operation correctly.

It is easily understandable that in cases such as a car exhaust pipe when the cut has to be made on the car itself, it is not easy to use tools such as saws, particularly if a fairly precise cut is necessary.

Another method that has been known for a long time makes use of tube cutting tools that operate by sawing and by cutting around the periphery, in which the groove depth is gradually increased by rotating the tool around the pipe within the transverse cutting plane; this type of tool usually comprises an annular casing that is placed around the pipe approximately in the cutting plane; this casing comprises a slitter that is tangential to the pipe on the cutting line and is rolled around the periphery of the pipe, the axis of rotation of the cutter remaining parallel to the center line of the pipe; two symmetrical arms spreading out radially from the annular casing of the pipe, firstly to rotate the said casing when the slitter is in contact with the pipe, and one of them is usually equipped with a strip of screws enabling an appropriate mechanism to push the center line of the slitter radially towards the pipe in order to increase the cutting pressure on the pipe as the slitter rotates; obviously, counter-reaction devices with rollers are provided to center the pipe in the annular casing, for which they facilitate rotation movements around the pipe. Obviously, this type of apparatus is completely unusable in cases in which the environment around the pipe is not sufficiently clear to enable free rotation of the arms controlling the rotation torque or the cutting pressure on the slitter, as described above.

SUMMARY OF THE INVENTION

Therefore, the purpose of the invention is to propose improvements to a hand-held apparatus for making clean and precise pipe cuts under conditions with difficult access, in other wards giving preference to the cutting technique rather than sawing techniques, as mentioned in the preamble, to overcome the disadvantages mentioned. In this respect, the manual apparatus for transverse cutting of pipes according to the invention using a hand-held apparatus for transverse cutting of a pipe using at least one slitter rolling around the external surface of a pipe in the transverse cutting plane and to which an approximately constant radial pressure is applied in cooperation with counter reaction rollers to provide a deepening cut until the pipe has been completely cut, is remarkable in that the apparatus is formed of two half-shells mounted around the pipe by clamping means adjustable in the cutting plane with internal concave faces facing each other, one of which supports at least one slitter installed at the same distance from each end of the half-shell and free to rotate around an axis perpendicular to the cutting plane and that may be fixed or free to move parallel to the cutting plane along the radial direction of the apparatus such that the cutting part projects radially beyond the internal surface of the half-shell by a value equal to or greater than the thickness of the pipe, and the other supports either at least two rollers that are advantageously identical mounted to project beyond the shell like on the second half-shell and distributed on each side at equal distances from the ends of the said half-shell, or at least two rollers free to rotate around two fixed axes perpendicular to the cutting plane so that their rolling surface projects radially from the inner surface of the half-shell and each axis is the same distance from the closest end of the half-shell, the slitter(s) all being in the same cutting plane, the rollers on the same half-shell being laid out in pairs facing each slitter on the other half-shell to compensate for the cutting force as the assembly rotates together around the pipe in the cutting plane, obtained by cooperation of a driving tool with catching means distributed on the external surface or around the periphery of each half-shell. An apparatus of this type is described in U.S. Pat. No. 3,163,932 in which the half-shells are hinged at one end and are provided with a quick fastener system to close them at the other end; obviously, this apparatus is limited to cutting a pipe with a particular diameter, since the width of the passage between the slitter and the roller is fixed during manufacture.

Furthermore, this special tooling is particularly expensive to manufacture.

According to the invention, each half-shell of the apparatus has the same general shape obtained starting from a flat with an appropriate thickness, for example made of steel plate, cut out and stamped in the general shape of a ring with a vertical axis of symmetry in its plane, and a recess in the center of the ring being provided into which the largest sections of the pipe to be cut can be fixed, and its periphery being cut out as a function of the profile of the driving tool catching means such that the right side and left side of the vertical axis of symmetry of the ring can be made to correspond by orthogonal projection after the ring has been put in a general shape of a U by rectangular double folding around two vertical center lines parallel to the said vertical axis of symmetry and placed at equal distance from it, thus forming a cap for the cutters and/or the rollers after suitable folding and drillings, the top and bottom parts of the ring between the two folding lines corresponding to the bottom of the U and forming connecting parts between the left and right parts of the cap, and being designed to be fitted with adjustable means for tightening the two half-shells after assembly facing each other on opposite sides of the pipe.

It is easy to understand all the advantages of this type of apparatus which combines performances to be expected from the most highly professional apparatus, to the simplicity and the sturdiness well adapted to the function of the tool. In this respect, it is easy to understand the operation of this device that comprises two symmetrical assemblies that are simply placed on each side of the pipe to be cut and fixed in position opposite each other with their ends facing each other, as will be described later. In this case, it will be noted that the only environmental clearance limit is approximately equal to the greatest thickness of each half-shell, so that the most difficult (or almost) cases can be handled.

BRIEF DESCRIPTION OF THE DRAWINGS

Other characteristics and advantages of the invention will be better understood from the following description of a preferred embodiment of an apparatus according to the main claim of the invention defined below as a non-restrictive example with reference to the drawing in which:

DETAILED DESCRIPTION OF THE INVENTION

Figure 1:
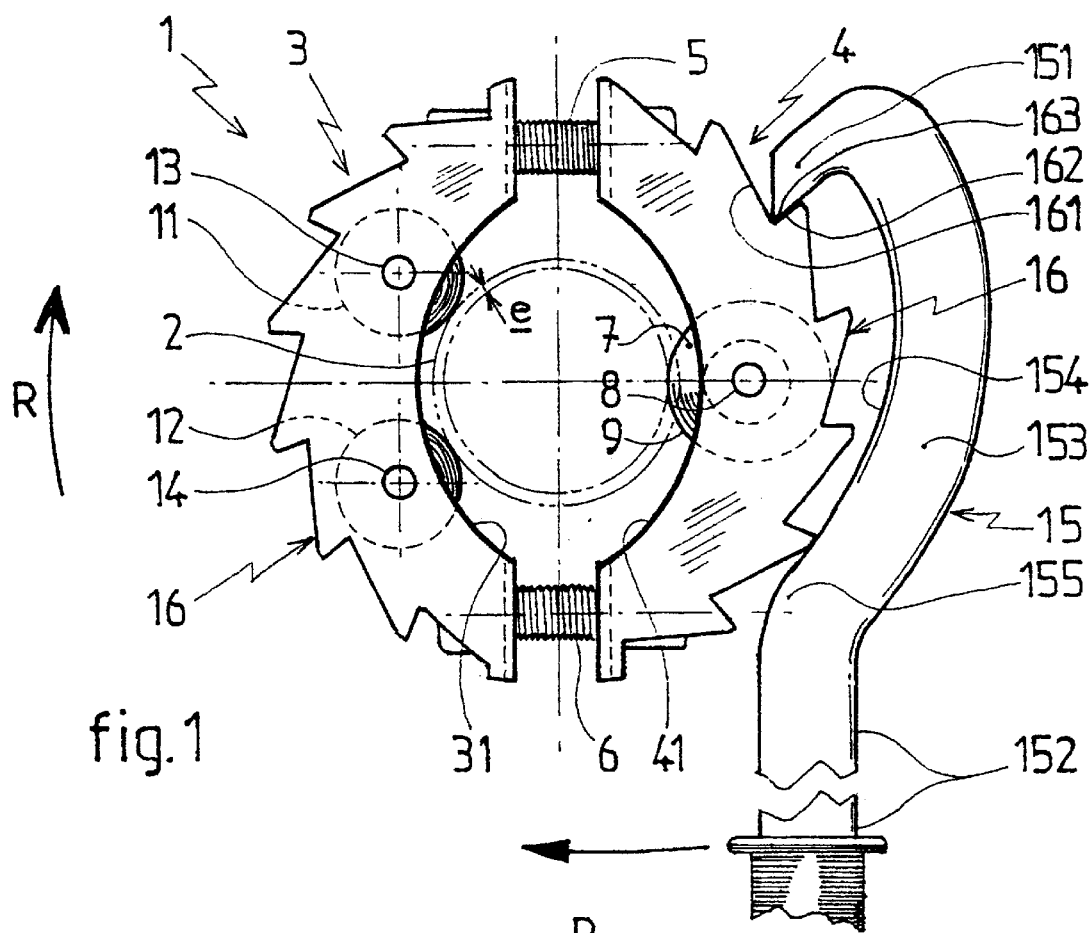
FIG. 1 shows a front and side view of an apparatus according to the invention mounted around a pipe to be cut by means of a pin wrench shown partially at the right in the figure.
Figure 2:
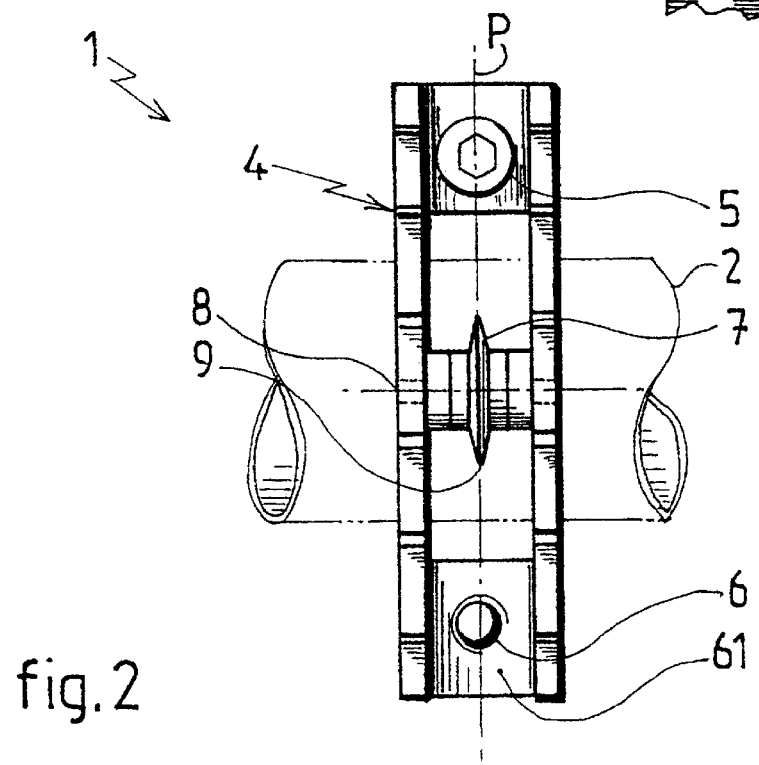
FIG. 2 is a front view of the previous figure without the pin wrench.

According to the preferred variant of the invention as shown in FIGS. 1 and 2 in the drawing, the hand-held apparatus 1 designed to make a transverse cut on a hollow cylindrical object such as a pipe 2, consists of the left half-shell 3 and right half-shell 4 shown in FIG. 1, advantageously identical and mounted facing each other on opposite sides of the pipe 2, in other words the concave nature of the internal surfaces 31, 41 of the half-shells 3 and 4 are facing each other when the two half-shells 3 and 4 are in contact with each other around the pipe, advantageously by means of two BTR type screws 5, 6 mounted as will be described later at the upper and lower ends of the two half-shells 3 and 4.

In its preferred configuration, the half-shell 4 of apparatus 1 is equipped with a slitter 7 located at an equal distance from the ends of the half-shell; the slitter 7 can then rotate freely about its axis 8 fixed perpendicular to the cutting plane P (FIG. 2) such that the cutting part 9 projects radially from the inside surface 41 of the half-shell 4 by a value greater than or equal to the thickness e of the pipe 2, and such that the rotational cutting operation of the tool in the cutting plane P, and the external surface of the pipe never comes into contact with the internal surface 41 of the half-shell 4, which would eventually prevent additional penetration of the cutting edge 9 of the slitter 7.

In the preferred variant, the radial forces applied by slitter 7 on pipe 2 are counteracted by two rollers 11 and 12 laid out symmetrically on opposite ends of the diameter of pipe 2 passing through the axis 8 of the slitter 7 along lines 13, 14 perpendicular to the cutting plane P and adjacent to the half-shell 3; advantageously, the distance to the lower and upper ends of the half-shell 3 will be equal, as will be described later. Obviously, the two rollers 11 and 12 project radially beyond the internal surface 31 of the half-shell 3, to prevent the pipe 2 from coming into contact with the internal surface 31 no matter the diameter of the pipe used in the range of cutting apparatuses 1.

When the apparatus 1 is thus configured and when it has three radial supports on pipe 2 to be cut, the apparatus can be rotated gradually around the same pipe using a driving tool 15 which will be described in detail later in the description.

Operation of the cutting apparatus is then very simple; in rotating the assembly 1, the slitter 7 driven tangentially on pipe 2 that is assumed to remain fixed, cuts the pipe along a line around the perimeter defining the cutting plane P; naturally, the depth of the cut will be proportional partly to the sharpness and the shape of the cutting edge 9 of the slitter 7, and also to the force due to the pressure applied to the same slitter 7 on the pipe 2 at the contact point; this radial pressure force between the slitter 7 and the pipe 2 is determined directly by the tightness between the two half-shells 3 and 4 which can easily be adjusted using two tangential screws 5 and 6 that, as mentioned above, tend to move the ends of the two half-shells 3 and 4 closer together.

According to a typical application of the invention, after being assembled around the pipe 2 to be cut by bringing the two half-shells 3 and 4 closer together around the pipe that will be brought significantly closer in the cutting plane P and held in place together by symmetrically engaging the two tangential screws 5 and 6 until all clearance between apparatus 1 and pipe 2 is eliminated, the slitter 7 then being forced into contact with pipe 2, in other words in the cutting position. Apparatus 1 is rotated around the pipe by means of a hand-held tool 15 such as a pin wrench, into which the slitter 7 penetrates for the first time. Before making a second turn of the apparatus, the operator tightens two tangential screws 5 and 6 by the same amount so that the pressure on the slitter 7 is the same as it was originally, so that a second turn can be made in order to make a new penetration of the same order as the first, and so on until the pipe is completely cut.

According to one essential characteristic of the invention, the rotational drive of the cutting apparatus 1 around the pipe 2 in the transverse cutting plane P, makes use of a preferred variant in which there is a ratchet mechanism as shown at the right in FIG. 1. Around the external periphery of each half-shell 3 and 4, pins 16 are fitted like the teeth in a ratchet, together with an access ramp 161 that is slightly inclined and a front 162 for determining the lead angle 163 between the base of the ramp 161 and the next pin, to cooperate with the hook-shaped outermost end 151 of the tool 15.

In this respect, the driving tool 15 comprises a handle 152 on which there is a halfmoon-shaped part 153 with a concave internal surface 154 that connects to the handle through a convex shoulder 155 and terminates with an appropriately shaped hook 151 that engages in the pins 16 of the half-shells 3, 4 as mentioned above, such that when the handle 15 is used as a lever, it pivots about the shoulder 155 that bears on another pin laid out lower down on the half-shell, forcing the assembly to rotate around pipe 2 engaging the hook 151 in the subsequent pins in sequence to give a regular rotation movement (arrow R FIG. 1) by translation movements on the handle 152 of tool 15.

Figure 3:
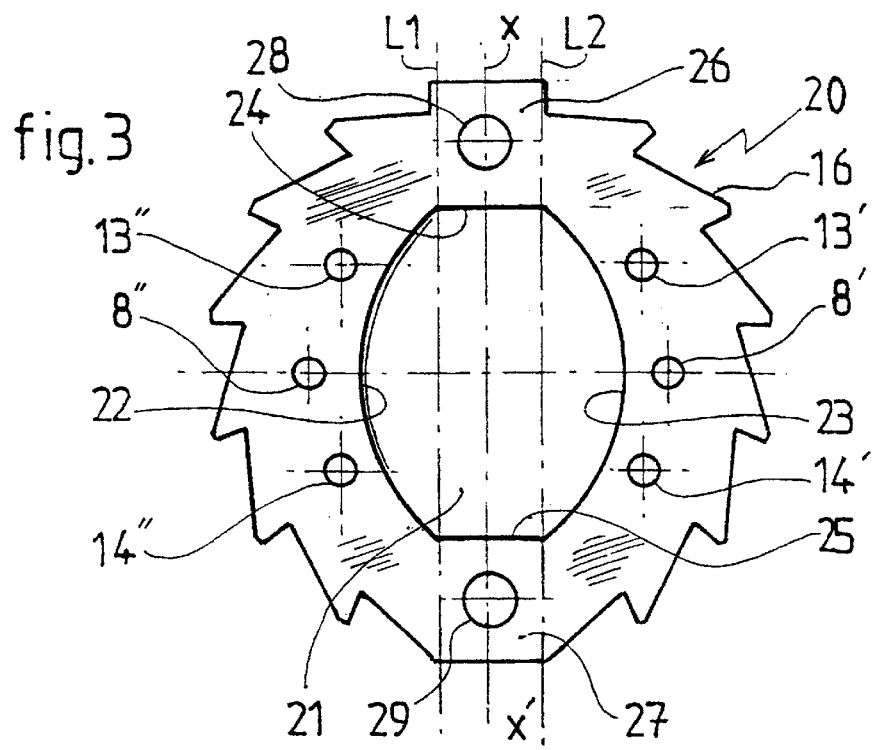
FIG. 3 is a front view of a cut and stamped steel plate part from which the shells will be formed after the various folding operations, to create the apparatus shown in the previous figures.
Figure 4:
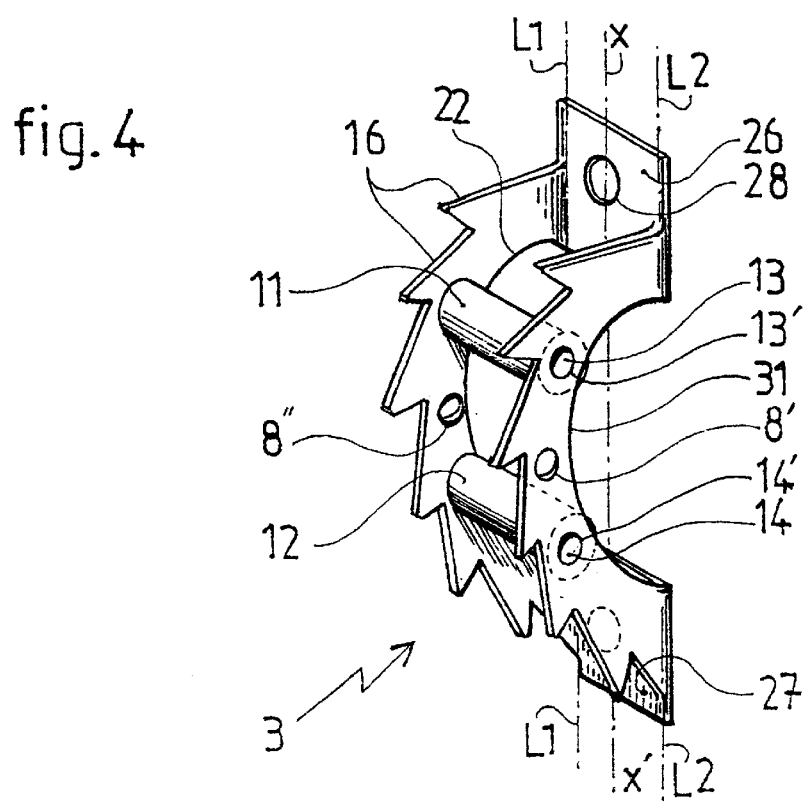
FIG. 4 shows a perspective view of a cap obtained by double folding of the part shown in the previous figure, that is assembled with the rollers and/or slitters to produce a half-shell of the apparatus according to the invention.

With reference to FIGS. 3 and 4 and according to one essential characteristic of the invention, a preferred embodiment of the apparatus 1 operating as described above will now be described.

Each half-shell 3, 4 is obtained from a cut out stamped from a suitable thickness, for example 4 millimeters, of a flat steel plate with the general shape of a ring 20 with a vertical axis of symmetry xx' in its plane, according to FIG. 3 in the drawing; a central recess 21 is provided in the center of this ring 20 delimited firstly to the left and right of the vertical axis of symmetry xx' by concave curves which may for example advantageously be identical arcs of circles mounted opposite each other and for which the radii will be defined later, and secondly at the top and bottom (in FIG. 3) by parallel segments 24, 25 connecting the top and bottom ends of the left 22 and right 23 concave curves, respectively.

Pins 16, the profile of which has already been specified above, are cut about vertical axis xx', symmetrically around the entire ring 20. As already mentioned at the beginning of this description, these pins 16 will subsequently be used as catching means for the activating tool as mentioned above.

Two plates 26 and 27 are provided in the top and bottom parts of the ring 20, forcing a connection between the left and right parts of the ring 20; advantageously, the connection parts 26, 27 are cut as described in FIG. 3 to form a square with a side equal to the length of segments 24, 25 connecting the internal curves 22, 23 of the central recess 21.

Finally, a certain number of drillings (8', 13', 14', 8", 13" and 14") are provided on the ring thus formed in order to subsequently hold the axes 8, 13 and 14, for the slitters 7 and counter-reaction rollers 11, 12 respectively. These drillings are placed symmetrically about xx' on ring 20; due to the required symmetry of parts forming the two half-shells of apparatus 1, it will be advantageous to make sure that all possible drillings on each ring 20 may or may not be used during assembly. Therefore, drillings were advantageously marked on the figures such that the references of devices that might cooperate with these drillings are formed by adding a prime symbol; according to the preferred embodiment, ring 20 will also be provided with two additional drillings 28, 29 located at the center of the upper connecting part 26 and lower connecting part 27 of the ring 20; these drillings will be used to insert tangential screws 5, 6 to be used for tightening the two half-shells 3, 4 around the pipe, as will be described later.

As shown in perspective in FIG. 4, the ring 20 in FIG. 3 will be shaped by folding to obtain each half-shell 3, 4; in the following example we will describe how the shell 3 at the left in FIG. 1 is obtained, comprising the pressure rollers 11, 12; it is obvious that the technique used to create the other half-shell 4 is identical, the only difference from the first half-shell being that rollers 11, 12 are replaced by the slitter 7 placed between the two drillings 8' and 8" on ring 20.

In making the half-shell 3, the ring 20 is folded twice in a rectangular manner around one of the two vertical axes L1, L2 (FIG. 2) passing the left and right sides of the two connecting parts 26, 27 of ring 20 respectively, for example these two connecting parts 26, 27 being supported in the plane of the drawing, the half-shell 3 being formed by putting the left and right sides of the ring 20 into the vertical direction by folding to a right angle about L1 and L2; this thus gives a U-shaped half-shell designed to form a cap in which the hinge pins 13, 14 of rollers 11, 12 (or center line 8 of the slitter 7) will be fitted, since the bores correspond perfectly because construction is symmetrical; furthermore and still by construction, in accordance with what has been mentioned above, the pins 16 on each side of the ring 20 installed in a U-shape, correspond by orthogonal projection and therefore give a toothed ratchet catching system that is particularly efficient for cooperating with the hook 151 on the driving tool 15.

It is obvious that experts in the subject will be fully aware of the techniques used to fold and install the rollers and slitters, and consequently these techniques will not be considered further in detail here.

In order to obtain a complete assembly of the apparatus 1, a shell 3 with its two rollers 11 and 12 are combined with a shell 4 mounted as described above very precisely in the same way, replacing the two rollers by a slitter 7, taking care to reverse the direction of the pins in shell 4 compared with the pins in shell 3, to obtain continuous teeth around the apparatus thus built up; all this is naturally made possible due to the complete symmetry of parts as described several times above. According to a preferred execution of the invention, the two half-shells 3 and 4 can be tightened opposite each other around the tube in pipe 2 to be cut using tangential screws 5, 6 that are inserted through the top bore 28 and the bottom bore 29 of each of the two half-shells 3 and 4.

According to another characteristic of the invention, the two tangential screws 5 and 6 are installed with the head at the right for 5 in FIG. 1 and with the head at the left for 6 on FIG. 1, which facilitates successive tightenings when cutting, by using two tools manipulated by each of the operator's hands at the same time.

According to another characteristic, the two screws 5, 6 cooperate with nuts 61 in FIG. 2, the outside shape of which engages between the two sides of the shells, thus preventing its rotation; an appropriate cutout of connecting parts 26, 27 enables the same nut to be blocked in the right position, for example by folding down one of the cutout parts.

Obviously other assemblies are quite possible and could be developed by an expert in the subject, for example such as directly drilling one of the two drillings 28 or 29 in the two half-shells 3 and 4 such that the screws on one cooperate with the thread on the other.

Similarly, according to other technically equivalent layouts, the two half-shells 3, 4 could be tightened by adjustable quick fastener systems (not shown in the figures) which could clamp on the other side, possibly but not necessarily in combination with a hinge along one side; however, these systems are expensive and undoubtedly less progressive than screw systems; it would also be possible to consider providing a hinge on one side and a single screw system on the other side as a variant to the preferred embodiment; it would also be possible to combine the previous solutions with radial displacement of the center line 8 of the slitter(s), or it would even be possible to adjust this radial displacement due to an advance mechanism that an expert in the subject would easily be able to design.

Finally, and according to a last characteristic of the invention, the space is limited between the two half-shells 3, 4 when they are mounted opposite each other, obviously in the shape of a central recess 21 formed on each ring 20 and particularly the capacity of apparatus 1 will depend on the radius of curvature of the concave internal surfaces 31, 41 of the two half-shells 3, 4.

In this respect, it is known that the curves 22 and 23 in the central recess 21 of the ring 20, when it is flat, directly control the radii of curvature 31 and 41 of the apparatus 1; therefore, it is suggested that the radius of the curves 22 and 23 should be equal to at least the radius of the largest pipe to be cut, and not too much so that the smallest pipe in the cutting range of the apparatus 1 can be placed on the two rollers 11 and 12 (alternately on the two slitters 7) without the internal concave surfaces 31, 41 of the two half-shells 3, 4 ever coming into contact. Thus, provided that a range of pipe diameters that can be cut by apparatus 1 can be found, the apparatus 1 can be made to cut a very large range of pipes, which is a decisive advantage.

Finally, it is obvious that the materials used for the half-shells, for example XC48 steel, and for the slitters or rollers (hardened steel) may be varied for specific embodiments without going outside the framework of the invention; furthermore, the size of the peripheral teeth used to drive the tool, for example using a pin wrench and various thicknesses or sizes of the ribs of each half-shell will easily be adapted as a function of the purpose and use to be made of the tool according to the invention. It is obvious that the rotational drive device selected in preference for use in the apparatus 1 according to the invention, namely cooperation between a peripheral ratchet device for apparatus 1 with a pin wrench 15 is not unique, and could be replaced by any technically equivalent device such as radial notches at the periphery of the apparatus cooperating with a claw key, or a series of peripheral drillings around the apparatus 1 cooperating with an appropriate key in the same way as pins or claws, etc. Finally, the ratchet and pin wrench solution appears to be the best solution, providing large rotations for small movements of the driving tool 15 since all that is necessary to turn the apparatus in a restricted space is to increase the pins around the periphery, and space is always restricted when making automotive repairs.

What is claimed is:

1. A hand-held apparatus for transversely cutting a pipe, comprising:
    a first half-shell structure having two spaced apart, coplanar end plates; two matching crescent portions that are each orthogonally joined to respective sides of said two end plates;
    each crescent portion having a concave internal surface and an outer surface having a plurality of catching elements;
    a second half-shell structure substantially identical to said first half-shell structure;
    a slitter positioned between the crescent portions of said first half-shell structure;
    counter reaction rollers positioned between the crescent portions of said second half-shell structure;
    said first half-shell structure and said second half-shell structure adapted to be mounted on opposite sides of a pipe with the respective concave internal surfaces facing each other;
    clamping elements for adjustably joining the end plates of the first half-shell structure to the end plates of the second half-shell structure at a variable distance;
    said slitter structured and arranged to roll around an external surface of the pipe in a transverse cutting plane, and said counter reaction rollers structured and arranged to apply an approximately constant radial pressure to said external surface to provide a deepening cut during each turn until the pipe has been completely cut.

2. The apparatus according to claim 1, further comprising a driving tool structured and arranged to act on the catching elements.

3. The apparatus according to claim 2, wherein the catching elements on the outer surface of each half-shell structure are of the half ratchet wheel type designed to cooperate with the driving tool that enables large rotations for a small movement of the driving tool.

4. The apparatus according to claim 3, wherein the catching elements are all identical and are present in sufficient number to enable sufficiently progressive rotation without excessive movements of the driving tool.

5. The apparatus according to claim 3, wherein the driving tool comprises a handle having a halfmoon-shaped part with a concave internal surface that connects to the handle through a convex shoulder and terminates with a hook that engages in a catching element.

6. The apparatus according to claim 1, wherein the counter reaction rollers are positioned such that their rolling surface projects radially beyond the concave internal surfaces of said second half-shell structure.

7. The apparatus according to claim 1, wherein said slitter includes a cutting part which projects radially beyond the concave internal surfaces of said first half-shell structure by a value equal to or greater than the thickness of the pipe.

8. The apparatus according to claim 1, wherein the clamping elements comprise an arbitrary combination of an adjustable fastener or a screw with a nut between the end plates of the first half-shell structure and the end plates of the second half-shell structure.

9. The apparatus according to claim 1, wherein each crescent portion includes a plurality of drillings structured and arranged to hold axes of the slitter and of the counter reaction rollers.

10. A method of making a pipe cutter, which comprises:
    a) providing a flat steel plate cut and stamped in the shape of a ring having a top part, a bottom part, a left part, a right part, and a vertical axis of symmetry; said ring having a central recess having a top, a bottom and two sides; said recess being delimited on each side of the vertical axis of symmetry by substantially identical concave curves, and delimited at the top and bottom by parallel segments connecting upper and lower ends of the concave curves;
    b) cutting catching elements symmetrically about the vertical axis of symmetry around an outer periphery of the ring;
    c) providing an end plate at the top part of the ring, and an end plate at the bottom part of the ring; the end plates forming a connection between the left and right parts of the ring;
    d) drilling a plurality of drillings on the ring symmetrically about the vertical axis of symmetry;
    e) folding the ring twice along vertical axes on each side of and parallel to the vertical axis of symmetry so as to obtain a first half-shell structure having two matching crescent portions that are orthogonally joined to respective sides of the end plates;
    f) repeating steps a) through e) so as to obtain a second half-shell structure that is substantially identical to the first half-shell structure;
    g) positioning a slitter between the crescent portions of the first half-shell structure;
    h) positioning counter reaction rollers between the crescent portions of the second half-shell structure; and
    i) providing clamping elements to adjustably join the end plates of the first half-shell structure to the end plates of the second half-shell structure at a variable distance.

* * * * *

UNITED STATES PATENT AND TRADEMARK OFFICE
CERTIFICATE OF CORRECTION

PATENT NO.    : 6,345,444 B1
DATED         : February 12, 2002
INVENTOR(S)   : Pascal Gillet et al.

It is certified that error appears in the above-identified patent and that said Letters Patent is hereby corrected as shown below:

<u>Title page,</u>
Item [73], Assignee, amend Assignee as follows:
-- [73]   Assignee: Gillet Outillage, Nogent (FR) --.

Signed and Sealed this

Seventeenth Day of September, 2002

Attest:

JAMES E. ROGAN
Attesting Officer        *Director of the United States Patent and Trademark Office*